W. J. CARROLL.

Cotton-Bale Ties.

No. 5,912. Reissued June 16, 1874.

WITNESSES.

Adolph Zeuneck.

Paul Coulson,

INVENTOR.

W J Carroll

Edson & Bro

Attys.

AM. PHOTO-LITHOGRAPHIC Co. N.Y. (OSBORNE'S PROCESS.)

UNITED STATES PATENT OFFICE.

WILLIAM J. CARROLL, OF NATCHEZ, MISSISSIPPI, ASSIGNOR TO THE PLANTERS' COTTON-TIE ASSOCIATION.

IMPROVEMENT IN COTTON-BALE TIES.

Specification forming part of Letters Patent No. 114,760, dated May 16, 1871; antedated May 12, 1871; reissue No. 5,912, dated June 16, 1874; application filed May 23, 1874.

*To all whom it may concern:*

Be it known that I, WILLIAM J. CARROLL, of Natchez, county of Adams and State of Mississippi, have invented an Improved Cotton-Bale Tie, being an improvement on my patent of 1866; and I do hereby declare the following to be a full, clear, and correct description thereof, reference being had to the accompanying drawing, and to the letters of reference marked thereon, making part of this specification, in which—

Figure 1:
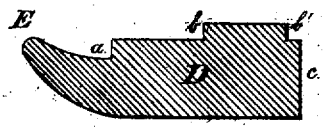
Figure 2:
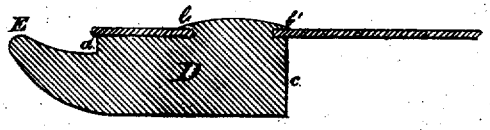
Figure 3:
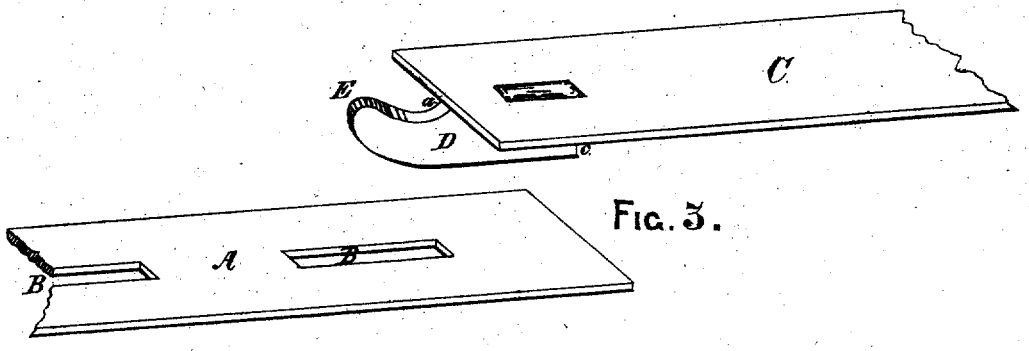
Figure 4:
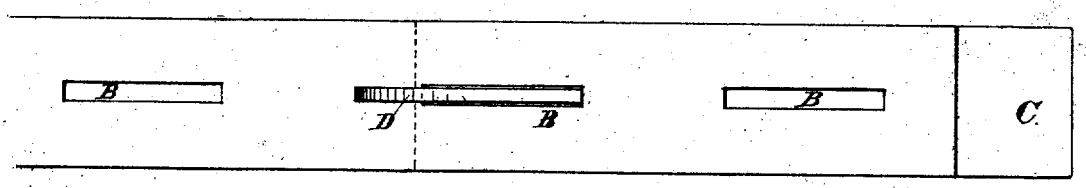
Figure 5:
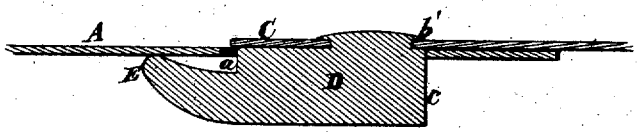

Figure 1 is a detached view of my improved cleat or fastening. Fig. 2 represents the above cleat riveted to one end of a bale-band in such a manner that the curved or hooked end of the said cleat shall project beyond the end of the band. Fig. 3 represents the opposite ends of the band brought nearly together, preparatory to locking or fastening the same together. Fig. 4 represents the under side of the band, or the side next the bale, after the fastening is made. Fig. 5 is a vertical longitudinal section of the cleat with both ends of the band secured thereto.

My invention consists of a stepped cleat attached to a band, and having a curved projection, which passes through a slot in the opposite end of the band, and nearly or quite engaging with or pressing against the lower side of the latter after the fastening is complete, thereby firmly and securely locking the same, and a square heel, all as hereinafter more fully described and claimed.

The curved or forward end of the cleat projects beyond the end of the band to which it is attached, in order that it may be conveniently slipped into one or the other of the elongated slots in the opposite end of the band.

The cleat D is made of metal, in the shape shown in Fig. 1, with its forward end E curved upward so as nearly or quite to reach an imaginary line drawn horizontally from the top of the step *a*, so that in practice said point or curved end E will press against the under side of the opposite end of the band, and thereby secure the fastening of the same. The step at *a* forms a shoulder, against which the inner edge of the slot in the band rests, and the step *b b'* forms the rivet or stem by which the cleat is attached to the band, so that the whole of the upper surface from *a* to *b'* impinges against the band, to which the cleat is riveted, and thus increases the leverage or resisting power of the stem or rivet, as shown at Fig. 2. The rear end or heel *c* of the cleat is made perfectly square, and stands exactly at a right angle to the under surface of the band, to which it is riveted, in order that the tie may be easily unfastened, when desired, by simply slipping a flat tool between the bands, behind the cleat, thereby raising the heel of the same until it comes above the edge of the slot, when the band is at once loosened. This facility for unfastening by so simple an action, while not detracting in the least from its strength and firmness when in use, enables the sampler or buyer of the cotton or other merchandise to take off one or more bands from the bale without cutting or injuring them in the least—a feature peculiar to this device as a bale-tie. Immediately behind the point or curved end of the cleat the metal is removed from the same, as shown on the drawing, in order that the rough edges or fringes of metal which may be left around the slots in the opposite end of the band may not interfere with the cleat, but leave the rounded point of the same free to engage the band when the fastening is made.

Having described my invention, what I claim as new, and desire to secure by Letters Patent, is—

1. The cleat D, having steps *a* and *b b'*, curved or hooked projection E, passing through a slot in the opposite end of the band, as described, and square heel *c*, placed at a right angle to the under surface of the band, substantially as and for the purpose set forth.

2. The cleat D, herein described, provided with the steps *a* and *b b'*, the curved or hooked projection E, and the square heel *c*, placed at a right angle to the under surface of and in combination with the slotted band A, constructed as shown, and for the purpose set forth.

W. J. CARROLL.

Witnesses:
ADOLPH ZENNECK,
PAUL COALSON.